(12) United States Patent
Min

(10) Patent No.: US 12,466,516 B2
(45) Date of Patent: Nov. 11, 2025

(54) METHOD AND SYSTEM FOR CONTROLLING ELECTRIC MOBILITY

(71) Applicant: HL MANDO CORPORATION, Gyeonggi-do (KR)

(72) Inventor: Kyunghyun Min, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 141 days.

(21) Appl. No.: 18/219,567

(22) Filed: Jul. 7, 2023

(65) Prior Publication Data
US 2024/0326951 A1  Oct. 3, 2024

(30) Foreign Application Priority Data

Mar. 31, 2023 (KR) .......................... 10-2023-0042704

(51) Int. Cl.
*B62M 6/45* (2010.01)
*H02P 1/16* (2006.01)

(52) U.S. Cl.
CPC ................. *B62M 6/45* (2013.01); *H02P 1/16* (2013.01)

(58) Field of Classification Search
CPC ... B62M 6/45; B62M 6/50; H02P 1/16; B60L 2200/12; B60L 2200/14; B60L 2200/16; B60L 2200/22; B60L 2200/24; B60L 2250/24; B60L 15/2072; B60L 15/2081; B60L 50/20; B62K 23/02; B62L 3/00; B62J 45/41; H02K 7/1846
See application file for complete search history.

(56) References Cited

U.S. PATENT DOCUMENTS

| | | | | |
|---|---|---|---|---|
| 11,565,725 | B2* | 1/2023 | Kim | B60T 7/065 |
| 11,981,308 | B2* | 5/2024 | Kim | B60K 26/02 |
| 2013/0274983 | A1* | 10/2013 | Matsuda | B60L 15/20 |
| | | | | 701/22 |
| 2022/0233376 | A1* | 7/2022 | Raja | A61G 5/0825 |
| 2023/0312044 | A1* | 10/2023 | Katayama | B60W 30/18036 |
| 2023/0339344 | A1* | 10/2023 | Chon | B60L 58/12 |

FOREIGN PATENT DOCUMENTS

| | | |
|---|---|---|
| CN | 203438868 | 2/2014 |
| CN | 110001853 | 7/2019 |
| JP | 2000-50418 | 2/2000 |

OTHER PUBLICATIONS

Apache: "User Manual for E-bikes", Aug. 20, 2020.
Extended European Search Report dated Jan. 9, 2024 for European Patent Application No. 23185909.1.
Office Action dated Jun. 30, 2025 for Korean Patent Application No. 10-2023-0042704 and its English translation provided by Applicant's foreign counsel.

* cited by examiner

*Primary Examiner* — Richard M Camby
(74) *Attorney, Agent, or Firm* — WOMBLE BOND DICKINSON (US) LLP

(57) ABSTRACT

A method and system for controlling an electric mobility are provided. The method and system may determine whether a brake is operated in a stationary state in which the electric mobility is stopped; convert the state of the electric mobility from the stationary state into a brake operation state if it is determined that the brake is operated in the stationary state; determine whether the brake is released in the brake operation state; and convert the state of the electric mobility from the brake operation state into a standby state in which the mobility can be started if it is determined that the brake is released in the brake operation state.

14 Claims, 7 Drawing Sheets

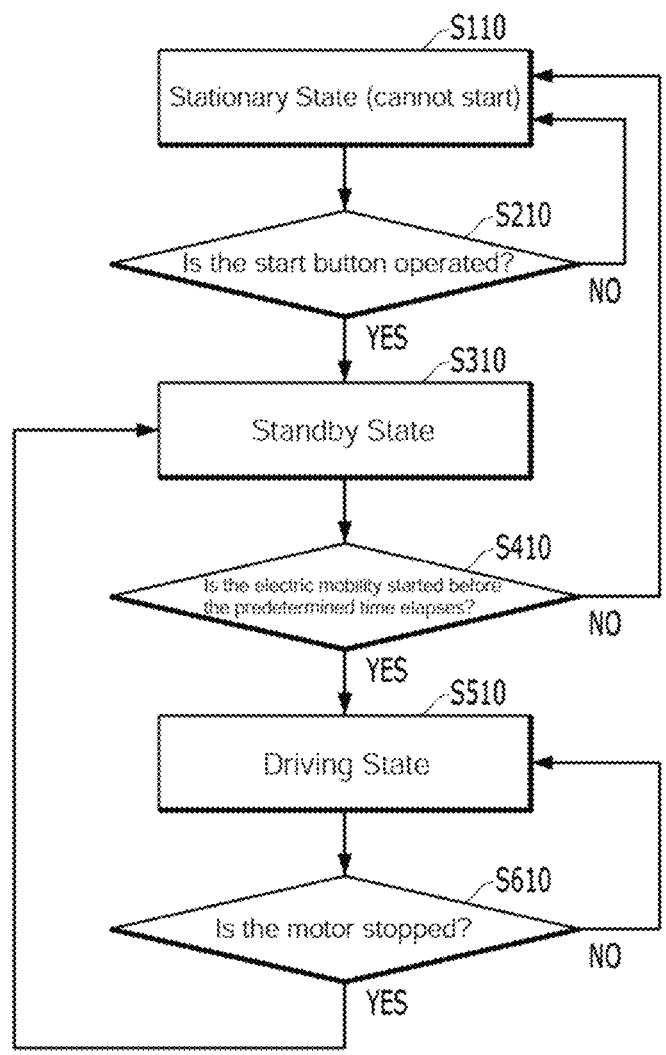

METHOD AND SYSTEM FOR CONTROLLING ELECTRIC MOBILITY

CROSS-REFERENCE TO RELATED APPLICATION

This application claims the benefit of and priority to Korean Patent Application No. 2023-0042704 filed on Mar. 31, 2023, the entire disclosures of which are incorporated herein by reference.

TECHNICAL FIELD

The present disclosure generally relates to a method and system for controlling or driving an electric mobility. More specifically, the present disclosure relates to a method and system for controlling or driving an electric mobility that can check or confirm user's intention to start the electric mobility and control the electric mobility to start only if the user has the intention to start the electric mobility.

BACKGROUND

An electric mobility, such as an electric transport, an electric bicycle or an electric cargo (e-cargo), assists a person, or drives the electric mobility by driving a motor with electricity. A PAS (Pedal Assistance System) type method uses the power of a motor to assist a person stepping on a pedal to drive the wheels, and a throttle type method drives the wheels only with the power of the motor by pulling a handle. In addition, there is also a PAS/throttle type electric mobility that supports both the PAS type method and the throttle type method.

SUMMARY

According to some embodiments of the present disclosure, a driving control method of an electric mobility may comprise: a brake operation determination step of determining whether a brake is operated in a stationary state in which the electric mobility is stopped; a brake operation state conversion step of converting the electric mobility into a brake operation state if it is determined that the brake is operated in the brake operation determination step; a brake release determination step of determining whether the brake is released in the brake operation state; and a standby state conversion step of converting the electric mobility into a standby state in which the electric mobility can be started if it is determined that the brake is released in the brake release determination step.

The driving control method may further comprise a stationary state conversion step of controlling the electric mobility to be converted into the stationary state if a predetermined time has elapsed without starting the electric mobility in the standby state.

The driving control method may further comprise a driving state conversion step of converting the electric mobility into a driving state in which a motor is being driven if a pedal or a throttle mounted at the electric mobility is operated before a predetermined time elapses in the standby state.

Further, if the brake is operated again in the standby state, the electric mobility may be converted into the brake operation state.

Further, the predetermined time may be set within a range from 5 seconds to 10 seconds.

Further, in the driving state, if the electric mobility is decelerated and the motor is stopped, the electric mobility may be converted into the standby state.

Further, in the stationary state, the electric mobility may not be started even if the pedal or the throttle mounted at the electric mobility is operated.

A driving control method of an electric mobility according to another embodiment of the present disclosure comprises: a start button operation determination step of determining whether a start button installed at the electric mobility is operated in a stationary state in which the electric mobility is stopped; and a standby state conversion step of converting the electric mobility into a standby state in which the electric mobility can be started if it is determined that the start button is operated in the start button operation determination step.

Further, the start button may be located on an interface installed at the electric mobility.

A driving system of an electric mobility according to embodiments of the present disclosure comprises: a generator configured to generate voltage by driving a pedal or operating a throttle; a motor mounted at at least one of front and rear wheels of the electric mobility to provide rotational force to a wheel; and a controller configured to control the driving system, wherein the controller comprises: a starting intention determination unit configured to determine a user's intention to start in a stationary state in which the electric mobility is stopped; and a standby state conversion unit configured to convert the electric mobility into a standby state in which the electric mobility can be started if it is determined that there is the user's intention to start in the starting intention determination unit.

Further, the starting intention determination unit may determine whether a brake installed at the electric mobility is operated and then released, and determine that there is the user's intention to start if it is determined that the brake is released after being operated.

Further, the starting intention determination unit may determine whether a start button installed at the electric mobility is operated, and determine that there is the user's intention to start if it is determined that the start button is operated.

The control unit may further comprise a stationary state conversion unit configured to determine whether a predetermined time has elapsed without starting the electric mobility in the standby state, and to convert the electric mobility into the stationary state if the predetermined time has elapsed.

The control unit may further comprise a driving state conversion unit configured to determine whether a pedal or a throttle mounted at the electric mobility has been operated before a predetermined time elapses in the standby state, and to convert the electric mobility into a driving state in which the motor is being driven if the pedal or the throttle has been operated.

Further, the start button may be located on an interface installed at the electric mobility.

The above-described means for solving the problem is only exemplary and should not be construed as limiting the present disclosure. In addition to the exemplary embodiments described above, additional embodiments may exist in the drawings and the following detailed description.

According to certain embodiments of the present disclosure, it is possible to provide a method and system for controlling an electric mobility that enables safe driving by controlling the electric mobility to be started (e.g. initiate to drive a motor) only if the user has an intention to start the electric mobility.

In addition, according to some embodiments of the present disclosure, it is possible to provide a method and system for controlling an electric mobility with improved safety by allowing the electric mobility to be started only if the user has an intention to start.

However, the effects obtainable from the present disclosure are not limited to the effects described above, and other effects may exist.

BRIEF DESCRIPTION OF THE DRAWINGS

FIG. 5 is a flowchart for illustrating a method for controlling an electric mobility according to another embodiment of the present disclosure.

DETAILED DESCRIPTION

Figure 1:
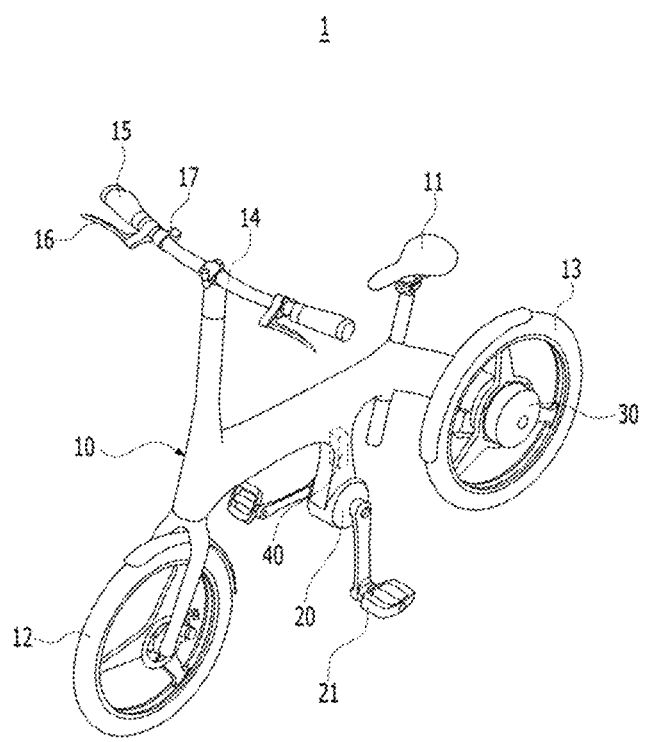
FIG. 1 is a perspective view for schematically showing an electric mobility according to an embodiment of the present disclosure.

Hereinafter, with reference to the accompanying drawings, embodiments of the present disclosure will be described in detail so that those skilled in the art can easily practice the embodiments. However, the present disclosure may be implemented in many different forms and is not limited to the embodiments described herein. In addition, in order to clearly describe the present disclosure in the drawings, parts irrelevant to the description are omitted, and similar reference numerals are attached to similar parts throughout the present disclosure.

Throughout the present disclosure, if a part is said to be "connected" to another part, it is not only "directly connected", but also "electrically connected" with another element in between, including cases where they are "indirectly connected".

Throughout the present disclosure, if one member is said to be located "on", "above", "under", or "below" the other member, this includes not only the case of being in contact with the other member, but also the case that another member is positioned between the two members.

Throughout the present disclosure, if a part "includes" a certain component, it does not mean excluding other components, and it does mean that it may further include other components, unless otherwise stated.

Various embodiments of the present disclosure generally relate to a driving control method of an electric mobility and a driving system of the electric mobility.

FIG. 1 is a perspective view for schematically illustrating an electric mobility according to an embodiment of the present disclosure.

An electric bicycle 1 shown in FIG. 1 as an example of an electric mobility may include a frame 10, a generator 20, a motor 30, and a controller 40.

In addition, a saddle 11 connected to the frame 10 may be provided for a user to board, and front and rear wheels 12 and 13 may be provided respectively at the front part and the rear part of the frame 10. The motor 30 may be provided on at least one of the front wheel 12 and the rear wheel 13, and in the example of FIG. 1, a configuration that the motor 30 provided on the rear wheel 13 provides rotational force to the rear wheel 13 is disclosed.

Pedals 21 are rotatably installed at both sides of the generator 20, and the rotational force of the pedal 21 may be converted into electrical energy in the generator 20 and the electrical energy may be charged in a battery provided in the frame 10.

In addition, a handlebar 14 for steering the electric bicycle 1 is provided at an upper and front part of the frame 10. Further, handles 15 provided at ends of the handlebar 14, brakes 16 for decelerating or stopping the electric bicycle 1 and a throttle 17 for driving the motor 30 may be provided.

Figure 2:
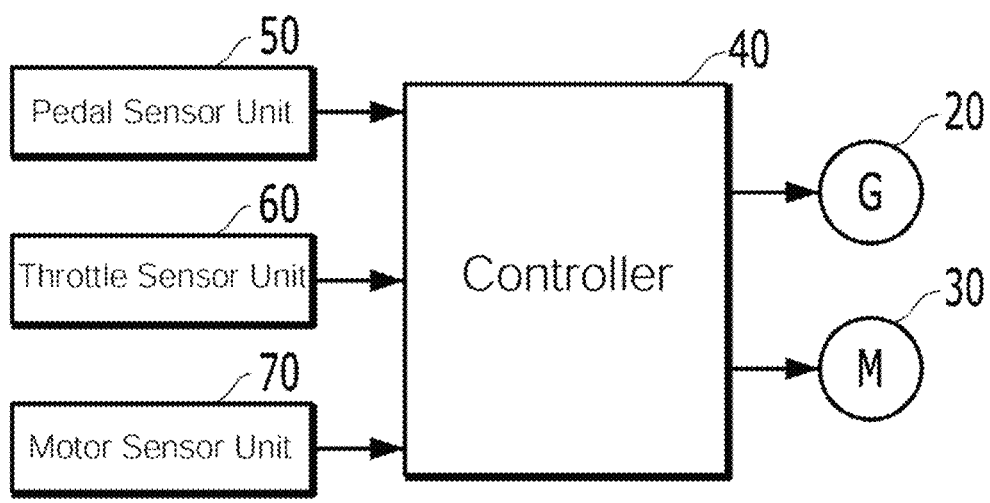
FIG. 2 is a block diagram of a system for controlling an electric mobility according to an embodiment of the present disclosure.

FIG. 2 is a block diagram for illustrating a system for controlling an electric mobility according to an embodiment of the present disclosure. The system may include, for example, a generator 20, a motor 30, a controller 40, a pedal sensor unit 50, a throttle sensor unit 60, and a motor sensor unit 70.

The pedal sensor unit 50 may be configured to detect the position and/or speed of the pedal 21, the throttle sensor unit 60 detects the manipulation or operation of the throttle 17, and the motor sensor unit 70 detects the position and/or speed of the motor 30. Based on the detection of the pedal sensor unit 50, the throttle sensor unit 60, and the motor sensor unit 70, the controller 40 may be configured to control the load of the generator 20 and the speed of the motor 30.

On the other hand, if the user is around the electric bicycle in a stationary state in which the motor of the electric bicycle 1 cannot be actuated or driven, or if the user accidentally moves the pedal 21 or the throttle 17, since the load of the generator 20 and the speed of the motor 30 are controlled based on the movement of the pedal 21 or the throttle 17, the electric bicycle 1 may be started in a situation where the user has no intention of starting the electric bicycle 1.

In this case, there may be a risk of injury to the user of the electric bicycle 1, and a collision with another person may also occur. In this respect, in using an electric mobility such as the electric bicycle 1, there may be a need for controlling the electric mobility to be started only when the user has the intention to start the electric mobility in order to ensure the safety.

Some embodiments or the present disclosure may solve the above-mentioned problems by providing a method and system for controlling an electric mobility that can be started only in a safe situation that a user has intention to start the electric mobility by checking the user's intention to start the electric mobility.

Figure 3:
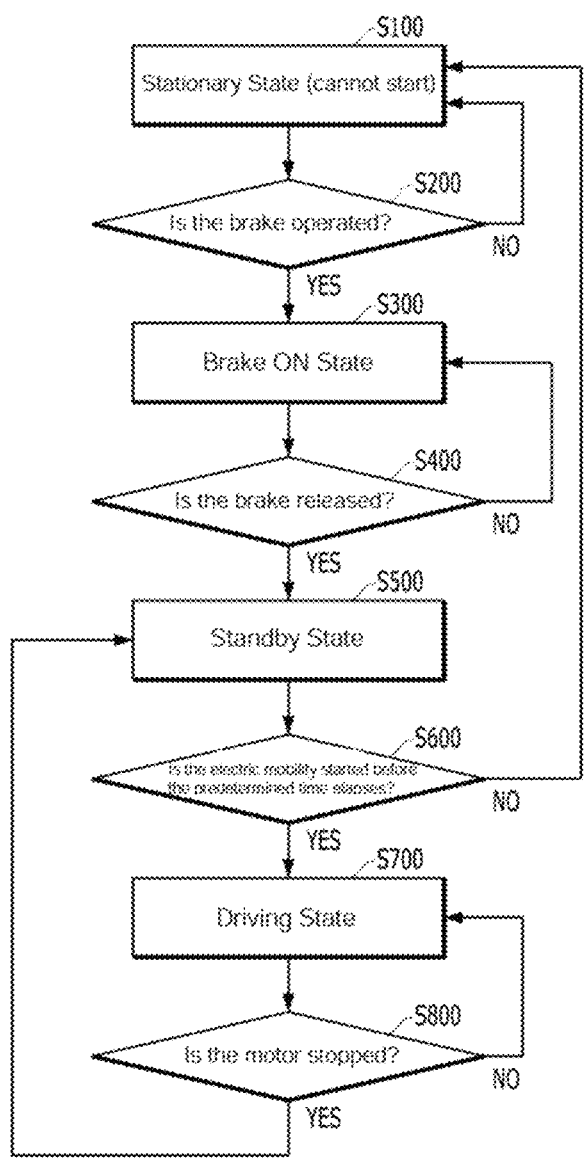
FIG. 3 is a flowchart for illustrating a method for controlling an electric mobility according to an embodiment of the present disclosure.

FIG. 3 is a flowchart illustrating a method for controlling an electric mobility according to an embodiment of the present disclosure.

Referring to FIG. 3, the method for controlling the electric mobility according to the embodiment of the present disclosure may include a brake operation determination step S200 of determining whether a brake of the electric mobility is operated in a stationary state S100 in which the electric mobility is stopped.

The stationary state S100 may be, for example, but not limited to, a state in which a motor of the electric mobility is not driven, and in this stationary state, the electric mobility (drive motor) cannot be started or initiated even if a pedal or a throttle is moved.

Meanwhile, in the present disclosure, "start" may mean start of driving or actuating the motor of the electric mobility. Therefore, if a user manually drags and moves an electric bicycle, although the wheels may rotate and the electric bicycle may move, since the motor is not being driven, it is not regarded as 'start' but regarded as the 'stationary state'.

If it is determined that the brake is applied or operated in the brake operation determination step S200 ('YES' in step S200), a brake operation state conversion step S300 of converting the state of the electric mobility into the brake operation state (a brake ON state) may be performed.

Subsequently, a brake release determination step S400 of determining whether the user has released the brake while the brake is operating may be performed.

If it is determined that the brake is released in the brake release determination step S400 ('YES' in S400), a standby state conversion step S500 of converting the state of the electric mobility into the standby state in which the electric mobility can be started may be performed.

In the standby state, the electric mobility can be started by operating the pedal or the throttle. At step S600, it is determined whether the electric mobility in the standby state is started by operating the pedal or the throttle mounted or included at the electric mobility before a predetermined time elapses. If the electric mobility is started before the predetermined time elapses ('YES in step S600'), the state of the electric mobility is converted into a driving state S700 in which the motor is being driven or actuated.

However, if the predetermined time has elapsed without starting the electric mobility in the standby state ('NO' in step S600), the state of the electric mobility may be controlled to return to the stationary state S100 in which the electric mobility cannot be started. This is to prevent the electric mobility from starting unintentionally in a situation where the time has passed after the brake is operated and then released, or the intention to start the electric mobility does not exist anymore.

Here, the predetermined time at step S600 may be set to be within a range of, for example, but not limited to, from about 5 seconds to about 10 seconds. If the predetermined time is set to be too short, it may cause inconvenience to the user, and if the predetermined time at step S600 is set to be too long, the possibility of accidentally operating the pedal or the throttle in a state where there is no intention to start the electric mobility may increase. Therefore, it is preferable to set the time to about 5 seconds or more and about 10 seconds or less.

On the other hand, if the brake is operated in the standby state, the state of the electric mobility may be converted into the brake ON state, and then if the brake is released, the state of the electric mobility may be converted into the standby state again.

Since the predetermined time is compared with time elapsed from when the brake is released so that the state of the electric mobility is converted into the standby state, the standby state may be maintained by repeating the apply and release of the brake.

On the other hand, since the motor of the electric mobility is being actuated or driven in the driving state initiated or converted by operating the pedal or the throttle in the standby state, the electric mobility may be accelerated or decelerated by manipulating or accelerating the pedal or operating the brake.

A step S800, it is determined whether the motor of the electric mobility is stopped after decelerating the electric mobility by the operation of the brake, and if it is determined that the motor is stopped ('YES' in step S800), the state of the electric mobility may be converted into the standby state.

Because the standby state is a state in which the electric mobility can be started, the motor of the electric mobility can be driven again if the user operates the pedal or the throttle within the predetermined time. However, the electric mobility may return to the stationary state as described above if the predetermined time elapses.

The method for controlling the electric mobility as described above can clearly confirm whether a user (e.g. a driver) has the intention to start the electric mobility by operating and releasing the brake, and may convert the state of the electric mobility into the standby state in which the motor can be driven only if the user has the intention to start the electric mobility. Accordingly, a remarkable effect can be accomplished in that safe use of the mobility becomes possible.

Figure 4A:
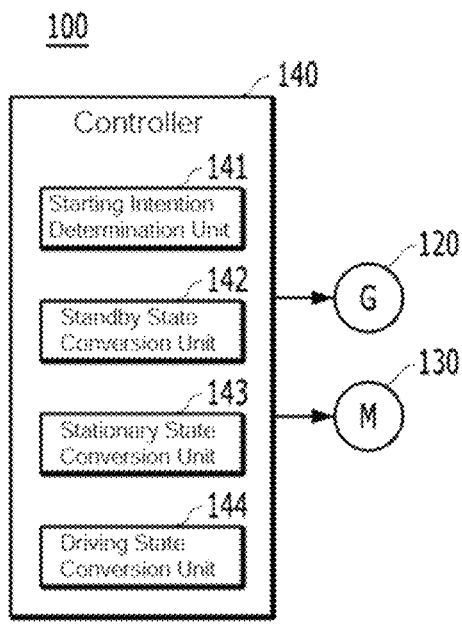
FIG. 4A is a block diagram for schematically illustrating a system for an electric mobility according to an embodiment of the present disclosure.
Figure 4B:
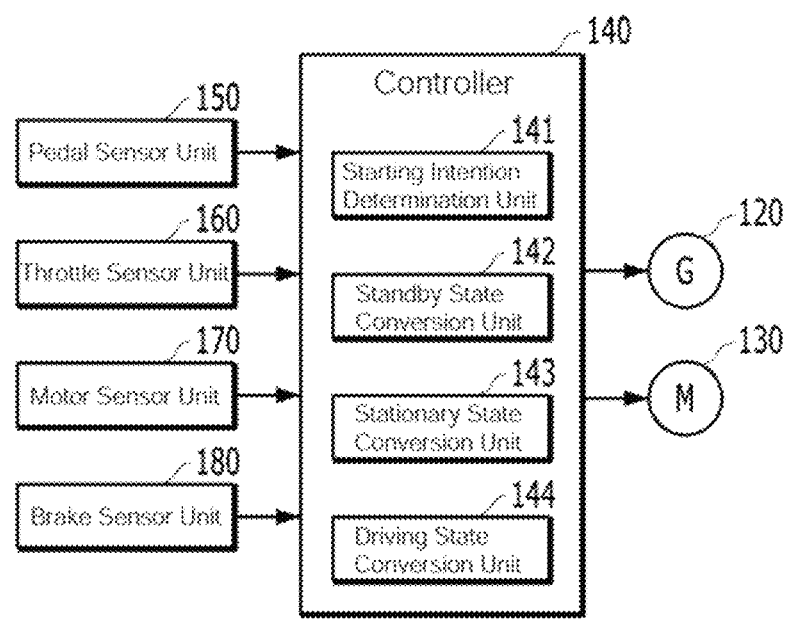
FIG. 4B is a block diagram for illustrating in detail a system for controlling an electric mobility according to an embodiment of the present disclosure.

FIG. 4A is a block diagram for schematically illustrating a system of controlling an electric mobility according to an embodiment of the present disclosure, and FIG. 4B is a block diagram for illustrating in detail a system of controlling an electric mobility according to an embodiment of the present disclosure.

Referring to FIG. 4A, a system 100 for driving or controlling the electric mobility according to the embodiment of the present disclosure may include a generator 120 configured to generate voltage in response to the user's manipulation or operation of a pedal or a throttle, a motor 130 configured to be driven by a current applied thereto, and a controller 140 configured to control the system 100.

Here, the controller 140 may include a starting intention determination unit 141 configured to determine the user's intention to start the electric mobility, a standby state conversion unit 142 configured to convert the state of the electric mobility into the standby state, a stationary state conversion unit 143 configured to convert the state of the electric mobility into the stationary state, and a driving state conversion unit 144 configured to convert the state of the electric mobility into the driving state in which the motor of the electric mobility is being driven.

According to an embodiment of the present disclosure, by converting the state of the electric mobility into the standby state in which the start of the electric mobility can be performed in the standby state conversion unit 142 after determining and confirming the user's intention to start the electric mobility in the starting intention determination unit 141, the system 100 may allow the electric mobility to be started only if the user has the intention to start the electric mobility.

In addition, it may be determined whether a predetermined time has elapsed without starting the electric mobility in the standby state. If the predetermined time has elapsed without starting the electric mobility in the standby state, the stationary state conversion unit 143 may convert the state of the electric mobility into the stationary state. Further, if the pedal or the throttle is operated or manipulated before the predetermined time elapses, the driving state conversion unit 144 may convert the state of the electric mobility into the driving state. Accordingly, the system 100 can effectively change the state of the electric mobility even if the user's intention to start the electric mobility is changed in the standby state.

Referring to FIG. 4B in more detail, a system for controlling an electric mobility according to an embodiment of the present disclosure may include a pedal sensor unit 150 configured to detect the position and/or speed of the pedal, a throttle sensor unit 160 configured to detect the operation of the throttle, a motor sensor unit 170 configured to detect the position and/or speed of the motor, and a brake sensor unit 180 configured to detect the apply or operation and the release of the brake.

In this regard, since only one of the pedal and the throttle may be provided depending on the electric mobility, the system for controlling the electric mobility according to an embodiment of the present disclosure may include either of the pedal sensor unit 150 and the throttle sensor unit 160.

On the other hand, as described above, if the electric mobility is in the stationary state, the system can be set such that the electric mobility cannot be started (e.g. the motor of the electric mobility cannot be driven) even if the pedal or the throttle is manipulated or operated.

If the user operates the brake to enter the brake ON state and then releases the brake, the controller 140 may receive the brake operation signal and then receive the brake release signal from the brake sensor unit 180, and the starting intention determination unit 141 may determine that the user has intention to start the electric mobility.

On the other hand, if it is determined that the user has the intention to start the electric mobility in the starting intention determination unit 141, the standby state conversion unit 142 may convert the state of the electric mobility into the standby state. Then, if the operation signal of the pedal or the throttle is received from the pedal sensor unit 150 or the throttle sensor unit 160 within the predetermined time, the driving state conversion unit 144 may determine the operation of the pedal or the throttle and convert the state of the electric mobility into the driving state in which the motor of the electric mobility is being driven.

On the other hand, if the operation signal of the pedal or the throttle is not received within the predetermined time, the stationary state conversion unit 143 may convert the state of the electric mobility back to the stationary state.

According to this configuration, the electric mobility can be driven only if the brake sensor unit 180 receives signals of applying/operating and releasing the brake, and thus, the motor of the electric mobility can be driven after confirming the user's intention to start the electric mobility. Accordingly, it is possible to prevent dangerous situations from occurring.

FIG. 5 is a flowchart illustrating a method for controlling an electric mobility according to another embodiment of the present disclosure.

Referring to FIG. 5, the method for controlling the electric mobility according to another embodiment of the present disclosure may include a start button operation determination step S210 of determining whether a start button installed at the electric mobility is operated or not in the stationary state S110 in which the electric mobility cannot be started.

In the stationary state S110 in which the electric mobility cannot be started, the motor of the electric mobility cannot be driven even if the pedal or the throttle is operated.

Thereafter, it is determined whether the start button is manipulated or operated in the start button operation determination step S210. If it is determined that the start button is manipulated or operated ('YES' in S210), a standby state conversion step S310 in which the state of the electric mobility is converted into the standby state in which the electric mobility can be started is performed.

In this standby state, the electric mobility can be started by operating the pedal or the throttle. That is, at step S410, it is determined whether the electric mobility is started by operating the pedal or the throttle mounted at the electric mobility before the elapse of the predetermined time in the standby state S310. If the electric mobility is started before the elapse of the predetermined time ('YES' in S410), the state of the electric mobility may be converted into the driving state S510 in which the motor of the electric mobility is being driven.

However, if the predetermined time has elapsed without starting the electric mobility in the standby state ('NO' in S410), the electric mobility can be controlled to return to the stationary state S110 in which the electric mobility cannot be started. This is for controlling the electric mobility to return to the stationary state after the predetermined time has elapsed, in order to prevent the electric mobility from starting unintentionally in a situation where a certain time has passed after the start button is manipulated or operated and the user has no intention to start the electric mobility any more.

The predetermined time may be set within a range of from about 5 seconds to about 10 seconds, although not required.

On the other hand, if the start button is manipulated or operated again in the standby state, it is determined whether the predetermined time has elapsed from the time that the start button was operated. Accordingly, the standby state may be continuously maintained by repeatedly operating the start button.

Since the motor of the electric mobility is being actuated or driven in the driving state initiated or converted by operating the pedal or the throttle in the standby state, the electric mobility can be accelerated or decelerated by manipulating or accelerating the pedal or operating the brake.

At step S610, it is determined whether the motor of the electric mobility is stopped by decelerating the electric mobility or operating or applying the brake. If the motor of the electric mobility is stopped ('YES' in S610), the state of the electric mobility may be converted into the standby state.

Since the standby state is a state in which the electric mobility can be started, if the user operates the pedal or the throttle within the predetermined time, the motor of the electric mobility can be driven again. However, if the predetermined time has elapsed without operating the pedal or the throttle, the electric mobility returns to the stationary state as described above.

According to another embodiment of the present disclosure, the state of the electric mobility can be converted into the standby state by the operation of the start button instead of operating and releasing the brake. Accordingly, the state the electric mobility can be converted into a state in which the electric mobility can be started by checking or confirming the user's intention to start the electric mobility in a simpler way.

In addition, by locating the start button at a location where it is difficult for the user to manipulate or operate it by mistake (for example, on an interface (Human Machine Interface; HMI) installed at the electric mobility), the user's intention to start the electric mobility can be more reliably confirmed. Accordingly, the possibility of occurrence of dangerous situations may be further reduced.

Figure 6:
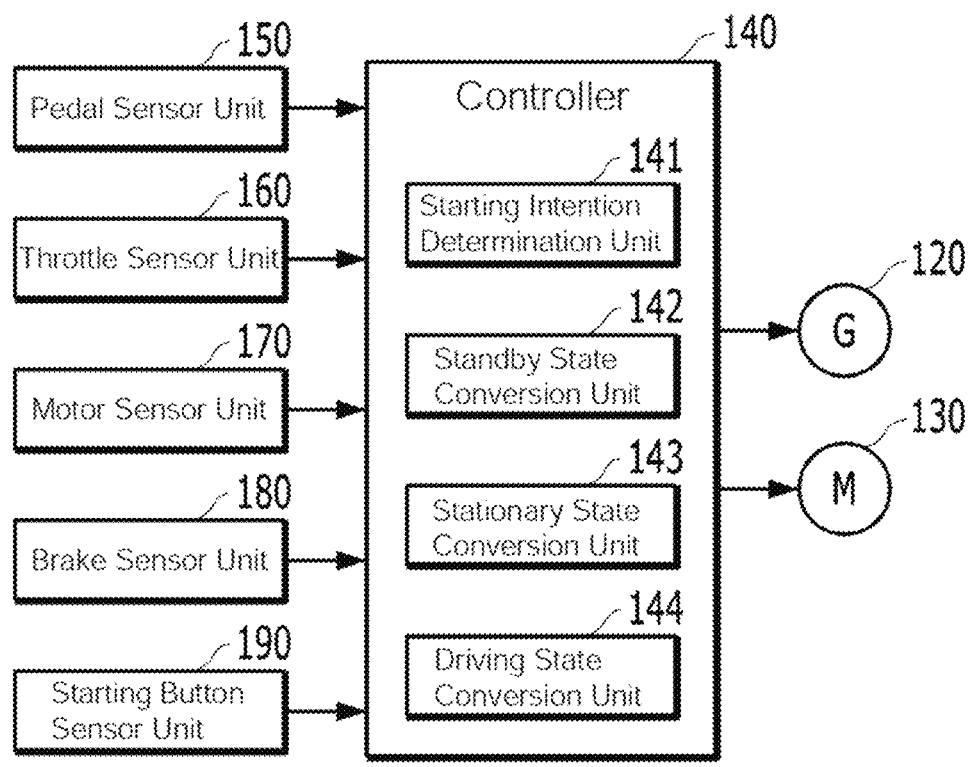
FIG. 6 is a block diagram for specifically illustrating a system for controlling an electric mobility according to another embodiment of the present disclosure.

FIG. 6 is a block diagram for illustrating a system for controlling an electric mobility according to another embodiment of the present disclosure.

The system for controlling the electric mobility according to another embodiment of the present disclosure may include a generator 120 configured to generate voltage in response to the manipulation or operation of a pedal or a throttle, a motor 130 configured to be driven by current applied thereto, and a controller 140 configured to control the system.

Here, the controller 140 may include a starting intention determination unit 141 configured to determine the user's intention to start the electric mobility, a standby state conversion unit 142 configured to convert the state of the electric mobility into the standby state, a stationary state conversion unit 143 configured to convert the state of the electric mobility into the stationary state, and a driving state conversion unit 144 configured to convert the state of the electric mobility into the driving state in which the motor of the electric mobility is being driven.

In addition, the system controlling the electric mobility according to another embodiment of the present disclosure may include a pedal sensor unit 150 configured to detect the position and/or speed of the pedal, a throttle sensor unit 160 configured to detect the operation of the throttle, a motor sensor unit 170 configured to detect the position and/or speed of the motor, a brake sensor unit 180 configured to detect the apply or operation, or release of the brake, and a start button sensor unit 190 configured to detect the manipulation or operation of the start button.

As described above, since some electric mobilities may include either one of the pedal and the throttle, the driving system of the present disclosure may include either one of the pedal sensor unit 150 and the throttle sensor unit 160.

If the start button is manipulated or operated in a stationary state in which the electric mobility cannot be started, the controller 140 may receive a start button operation signal from the start button sensor unit 190, and in response to the button operation signal, the starting intention determination unit 141 may determine whether a user has intention to start the electric mobility.

On the other hand, if it is determined that the user has the intention to start the electric mobility in the staring intention determination unit 141, the standby state conversion unit 142 may convert the state of the electric mobility into the standby state. Then, if an operation signal of the pedal or the throttle is received from the pedal sensor unit 150 or the throttle sensor unit 160 within the predetermined time, the driving state conversion unit 144 may determine that the pedal or the throttle is manipulated or operated and convert the state of the electric mobility into the driving state in which the motor of the electric mobility is being driven.

On the other hand, if the operation signal of the pedal or the throttle is not received within the predetermined time, the stationary state conversion unit 143 may convert the state of the electric mobility into the stationary state.

According to this configuration, by enabling to drive the electric mobility only if the start button operation signal is received from the start button sensor unit 190, so that the motor of the electric mobility can be actuated or driven after confirming the user's intention, it is possible to effectively prevent the dangerous situations from occurring.

Figure 7:
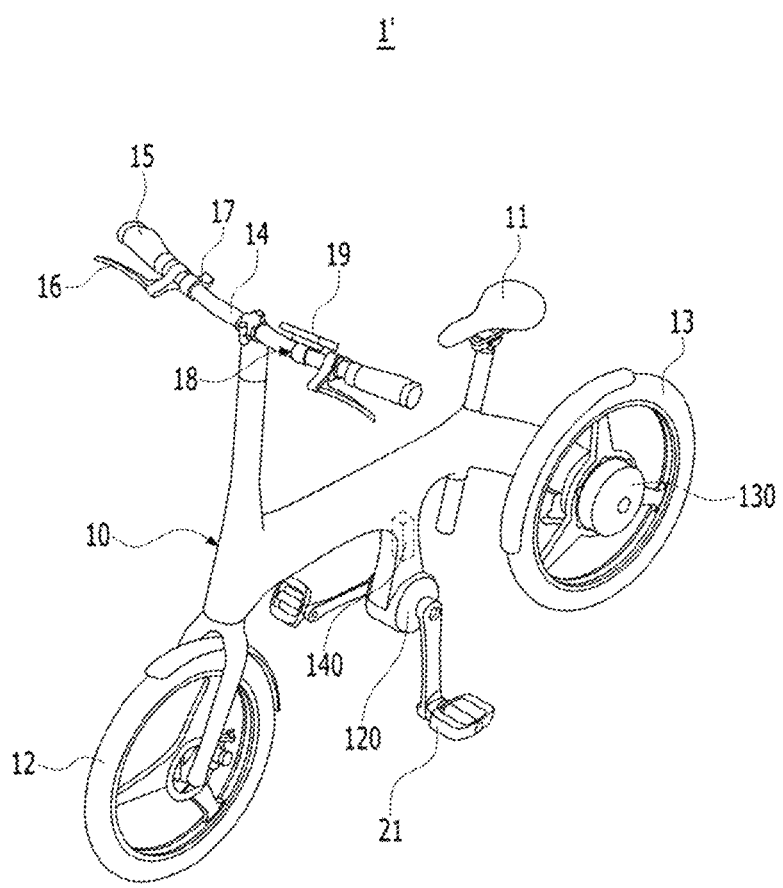
FIG. 7 is a perspective view for schematically illustrating an electric mobility according to another embodiment of the present disclosure.

FIG. 7 is a perspective view schematically illustrating an electric mobility according to another embodiment of the present disclosure.

Referring to FIG. 7, the electric mobility 1' according to another embodiment of the present disclosure may include a frame 10, a generator 120, a motor 130, and a controller 140. The generator 120 may comprise, for example, but not limited to, a power circuit for generating or providing power, and the controller 140 may comprise, for example, but not limited to, a processor or controller, or any suitable circuitry and/or electronic components, such as a microprocessor.

In addition, a saddle 11 connected to the frame 10 may be provided for the user to board, and front and rear wheels 12 and 13 may be respectively provided at the front and rear parts of the frame 10. In the exemplary embodiment of the present disclosure of FIG. 7, a configuration in which the motor 130 is provided on the rear wheel 13 is illustrated, but it is not limited thereto, and the motor 130 may be provided on at least one of the front wheel 12 or the rear wheel 13.

Pedals 21 may be rotatably mounted on both sides of the generator 120, and the rotational force of the pedal 21 may be converted into electrical energy in the generator 120 and the electrical energy can be charged in a battery provided in the frame 10.

In addition, a handlebar 14 for steering the electric mobility 1 may be provided at an upper part of the front part of the frame 10. The handlebar 14 may include handles 15 provided at ends of the handlebar 14, brakes 16 for decelerating or stopping the electric bicycle 1', and a throttle 17 for driving the motor 130.

Meanwhile, an interface (HMI) 18 may be installed at the handlebar 14, and a start button 19 may be provided on the interface 18. Specifically, the start button 19 may be a touch-type button capable of being touched on a display. However, the start button 19 may be implemented as a mechanical push button.

The controller 140 may determine whether the start button 19 is manipulated or operated in the stationary state. If it is determined that the start button 19 is manipulated or operated, the controller 140 may confirm that a user has intention to start the electric mobility and control the electric mobility to be in the standby state in which the electric mobility can be started.

In addition, if the controller 140 determines that the pedal 21 or the throttle 17 has been manipulated or operated within the predetermined time (e.g., from 5 to 10 seconds) in the standby state, the controller may control the electric mobility to be in the driving state in which the motor 130 is being driven.

On the other hand, if the pedal or the throttle is not manipulated or operated within the predetermined time, the controller 140 may control the electric mobility to be in the stationary state so that the electric mobility 1' cannot start.

In addition, the start button 19 may be installed on the interface 18 installed at a predetermined distance from the handle 15 on the handlebar 14. In this way, by installing the start button at the predetermined distance from the handlebar 14, it is possible to effectively prevent the user from accidentally operating the start button, and accordingly, it is possible to more reliably confirm the user's intention to start the electric mobility.

According to some embodiments of the present disclosure, in an e-mobility such as an electric transport, an electric bicycle or an electric cargo (e-Cargo), by checking an user's intention (e.g. a driver's intention) to start the electric mobility once again by determining whether the brake is operated and then released or whether the start button is operated, it is possible to provide a method and a system that can prevent unintentional start of the electric mobility and enable safe departure.

In addition, according to certain embodiments of the present disclosure, by determining whether the pedal or the throttle is manipulated or operated within a predetermined time in a standby state in which the electric mobility can be started and by converting the state of the electric mobility into a driving state or a stationary state based on the determination result, it is possible to provide a method and a system that can improve the user's safety and convenience at the same time.

The above description of the present disclosure is for illustrative purposes, and those skilled in the art may understand that it can be easily modified into other specific forms without changing the technical spirit or essential features of the present disclosure. Therefore, the embodiments described above should be understood as illustrative in all respects and not limiting. For example, each component described as a single type may be implemented in a distributed manner, and similarly, components described as distributed may be implemented in a combined form.

The scope of the present disclosure is indicated by the following claims rather than the above detailed description, and all changes or modifications derived from the meaning and scope of the claims and equivalent concepts should be interpreted to be included in the scope of the present disclosure.

EXPLANATION OF REFERENCE

100: Driving system
120: Generator
130: Motor
140: Controller
141: Starting intention determination unit
142: Standby state conversion unit
143: Stationary state conversion unit
144: Driving state conversion unit
150: Pedal sensor unit
160: Throttle sensor unit
170: Motor sensor unit
180: Brake sensor unit
190: Start button sensor unit

What is claimed is:

1. A method for controlling an electric mobility, the method comprising:
   determining whether a brake is operated in a stationary state in which the electric mobility is prevented from being started;
   if it is determined that the brake is operated in the stationary state, converting a state of the electric mobility from the stationary state into a brake operation state in which the brake is operated;
   determining whether the brake is released in the brake operation state in which the brake is operated;
   if it is determined that the brake is released in the brake operation state in which the brake is operated, converting the state of the electric mobility from the brake operation state into a standby state in which the electric mobility is allowed to be started;
   if a predetermined time has elapsed without starting the electric mobility in the standby state in which the electric mobility is allowed to be started, determining that there is no intention to start the electric mobility and controlling the electric mobility to be converted from the standby state, in which the electric mobility is allowed to be started, into the stationary state, in which the electric mobility is prevented from being started; and
   if a pedal or a throttle included in the electric mobility is operated before a predetermined time elapses in the standby state, determining that there is an intention to start the electric mobility and converting the state of the electric mobility from the standby state, in which the electric mobility is allowed to be started, into a driving state, in which a motor comprised in the electric mobility is being driven.

2. The method of claim 1, further comprising, if the brake is operated in the standby state in which the electric mobility is allowed to be started, converting the state of the electric mobility from the standby state into the brake operation state in which the brake is operated.

3. The method of claim 1, wherein the predetermined time is set within a range from 5 seconds to 10 seconds.

4. The method of claim 1, further comprising, if the electric mobility is decelerated and the motor comprised in the electric mobility is stopped in the driving state in which the motor is driven, converting the state of the electric mobility from the driving state, in which the motor is driven, into the standby state, in which the electric mobility is allowed to be started.

5. The method of claim 1, wherein, in the stationary state, the electric mobility is not started even if a pedal or a throttle included in the electric mobility is operated.

6. A method for controlling an electric mobility, the method comprising:
   determining whether a start button associated with the electric mobility is operated in a stationary state in which the electric mobility is prevented from being started;
   if it is determined that the start button is operated in the stationary state, converting the state of the electric mobility from the stationary state, in which the electric mobility is prevented from being started, into a standby state in which the electric mobility is allowed to be started;
   if a predetermined time has elapsed without starting the electric mobility in the standby state in which the electric mobility is allowed to be started, determining that there is no intention to start the electric mobility and converting the state of the electric mobility from the standby state, in which the electric mobility is allowed to be started, into the stationary state, in which the electric mobility is prevented from being started; and
   if a pedal or a throttle included in the electric mobility is operated before a predetermined time elapses in the standby state in which the electric mobility is allowed to be started, determining that there is an intention to start the electric mobility and converting the state of the electric mobility from the standby state, in which the electric mobility is allowed to be started, into a driving state, in which a motor comprised in the electric mobility is being driven.

7. The method of claim 6, wherein the predetermined time is set within a range from 5 seconds to 10 seconds.

8. The method of claim 6, further comprising, if the electric mobility is decelerated and the motor included in the electric mobility is stopped in the driving state in which the motor is driven, converting the state of the electric mobility from the driving state, in which the motor is driven, into the standby state, in which the electric mobility is allowed to be started.

9. The method of claim 6, wherein, in the stationary state, the electric mobility is not started even if a pedal or a throttle included in the electric mobility is operated.

10. The method of claim 6, wherein the start button is provided on a user interface associated with the electric mobility.

11. A system for controlling an electric mobility, the system comprising:
- a generator configured to generate voltage in response to operation of a pedal or a throttle;
- a motor operably connected to at least one of wheels of the electric mobility; and
- a controller configured to:
- determine whether a user has intention to start the electric mobility in a stationary state in which the electric mobility is prevented to be started,
- if it is determined that the user has the intention to start the electric mobility in the stationary state, convert a state of the electric mobility from the stationary state, in which the electric mobility is prevented to be started, into a standby state, in which the electric mobility is allowed to be started,
- determine whether a predetermined time has elapsed without starting the electric mobility in the standby state in which the electric mobility is allowed to be started,
- if the predetermined time has elapsed without starting the electric mobility in the standby state, determine that there is no intention to start the electric mobility and convert the state of the electric mobility from the standby state, in which the electric mobility is allowed to be started, into the stationary state, in which the electric mobility is prevented to be started, and
- if the pedal or the throttle is operated before the predetermined time elapses in the standby state, determine that there is an intention to start the electric mobility and convert the state of the electric mobility from the standby state, in which the electric mobility is allowed to be started, into a driving state in which the motor included in the electric mobility is driven.

12. The system of claim 11, wherein the controller is configured to:
- determine whether a brake included in the electric mobility is operated and then released, and
- if it is determined that the brake is released after being operated, determine that the user has intention to start the electric mobility.

13. The system of claim 11, wherein the controller is configured to:
- determine whether a start button associated with the electric mobility is operated, and
- if it is determined that the start button is operated, determine that the user has the intention to start the electric mobility.

14. The system of claim 13, wherein the start button is provided on a user interface associated with the electric mobility.

* * * * *